US012688724B2

(12) United States Patent
Lee et al.

(10) Patent No.: US 12,688,724 B2
(45) Date of Patent: Jul. 21, 2026

(54) MOBILE DEVICE AND INPUT METHOD

(71) Applicant: Getac Technology Corporation, New Taipei (TW)

(72) Inventors: Jiunn-Jye Lee, Taipei (TW); Tzu-Chieh Wei, Taipei (TW); Yen-Lung Peng, Taipei (TW)

(73) Assignee: Getac Technology Corporation, New Taipe (TW)

( * ) Notice: Subject to any disclaimer, the term of this patent is extended or adjusted under 35 U.S.C. 154(b) by 294 days.

(21) Appl. No.: 18/234,444

(22) Filed: Aug. 16, 2023

(65) Prior Publication Data

US 2024/0412545 A1     Dec. 12, 2024

(30) Foreign Application Priority Data

Jun. 7, 2023    (CN) ......................... 202310667740.X

(51) Int. Cl.
G06V 30/224       (2022.01)
G06F 3/04817      (2022.01)
G06F 3/04842      (2022.01)
G06F 3/04886      (2022.01)

(52) U.S. Cl.
CPC ........ G06V 30/224 (2022.01); G06F 3/04817 (2013.01); G06F 3/04842 (2013.01); G06F 3/04886 (2013.01)

(58) Field of Classification Search
USPC ....................................................... 382/182
See application file for complete search history.

(56) References Cited

U.S. PATENT DOCUMENTS

| | | | |
|---|---|---|---|
| 6,782,144 B2 | 8/2004 | Bellavita et al. | |
| 7,222,789 B2 | 5/2007 | Longacre, Jr. et al. | |
| 8,469,275 B2 | 6/2013 | Dahari | |
| 9,195,868 B2 | 11/2015 | Ehrhart et al. | |
| 10,216,286 B2 | 2/2019 | Chornenky | |
| 11,379,116 B2 | 7/2022 | Park et al. | |

(Continued)

FOREIGN PATENT DOCUMENTS

| | | | |
|---|---|---|---|
| CN | 103513892 A | * | 1/2014 |
| CN | 106354277 A | | 1/2017 |

(Continued)

*Primary Examiner* — Jacky X Zheng

(74) *Attorney, Agent, or Firm* — Troutman Pepper Locke LLP; Tim Tingkang Xia, Esq.

(57)        ABSTRACT

A mobile device includes a general camera module, a touch display module, a barcode scanning module, a character recognition engine, and a control module. The general camera module is configured to generate an image. The touch display module is configured to display a text input field and an overlapping window with a virtual keyboard of a system default input method and a preview pane. The barcode scanning module is configured to scan one or more first barcodes to obtain one or more first character strings. The character recognition engine is configured to perform a character recognition on the image. The control module is configured to activate one of the barcode scanning module and the character recognition engine and control the touch display module to display one of the one or more first character string and the one or more second character string in the text input field.

17 Claims, 11 Drawing Sheets

(56)             References Cited

U.S. PATENT DOCUMENTS

| | | | | |
|---|---|---|---|---|
| 2013/0234945 | A1* | 9/2013 | Goktekin | G06F 3/04883 |
| | | | | 345/168 |
| 2017/0078515 | A1* | 3/2017 | Shimura | H04N 1/00095 |
| 2022/0318036 | A1 | 10/2022 | Zhang et al. | |
| 2024/0411447 | A1* | 12/2024 | Lee | G06V 30/10 |

FOREIGN PATENT DOCUMENTS

| | | | |
|---|---|---|---|
| CN | 108388346 | A | 8/2018 |
| CN | 113168285 | A | 7/2021 |
| EP | 3133801 | A1 | 2/2017 |
| TW | 202030582 | A | 8/2020 |

* cited by examiner

MOBILE DEVICE AND INPUT METHOD

CROSS-REFERENCE TO RELATED APPLICATION

This non-provisional application claims priority under 35 U.S.C. § 119 (a) to patent application No. 202310667740.X filed in China, P.R.C. on Jun. 7, 2023, the entire contents of which are hereby incorporated by reference.

BACKGROUND OF THE INVENTION

As to a mobile device known to the inventor, when the camera lens of the mobile device is used to perform image recognition to convert an image into text(s) (such as barcode decoding, QR code decoding, OCR character recognition, and license plate recognition), the user usually needs to open the camera in a specific application installed in the mobile device, perform image capture and recognition in the application, and then manually copy and paste the recognized text to the desired text input field. The operation is not intuitive, the steps of the operation are numerous, and the user usually has to switch the operations between the applications in the mobile device, which thus affects the user's experience.

SUMMARY OF THE INVENTION

In some embodiments, a mobile device comprises a general camera module, a touch display module, a barcode scanning module, a character recognition engine, and a control module. The general camera module is configured to generate an image. The touch display module is configured to display a text input field and an overlapping window with a virtual keyboard of a system default input method and a preview pane of an image conversion input method at the same time. The barcode scanning module is configured to scan at least one first barcode to obtain at least one first character string represented by the at least one first barcode, wherein the image conversion input method is linked to the barcode scanning module. The character recognition engine is coupled to the general camera module and is configured to perform a character recognition on the image to obtain at least one second character string, wherein the image conversion input method is linked to the character recognition engine. The control module is coupled to the general camera module, the touch display module, the barcode scanning module, and the character recognition engine, wherein the control module is configured to activate one of the barcode scanning module and the character recognition engine and control the touch display module to display one of the at least one first character string and the at least one second character string in the text input field.

In some embodiments, the barcode scanning module is further configured to generate a preview image having at least one barcode image, and the control module is further configured to display the preview image in the preview pane in a real-time manner.

In some embodiments, the barcode scanning module comprises a specific camera module and a barcode decoding module. The specific camera module is configured to photograph the at least one first barcode to obtain the at least one barcode image and the preview image. The barcode decoding module is coupled to the specific camera module and the control module and is configured to decode the at least one barcode image into the at least one first character string.

In some embodiments, the overlapping window further comprises a candidate field. The candidate field is above the virtual keyboard and the preview pane, and the control module is further configured to display one of the at least one first character string and the at least one second character string as an input option of the text input field in the candidate field.

In some embodiments, the control module is further configured to display the image in the preview pane in a real-time manner after the character recognition engine is activated.

In some embodiments, the overlapping window further comprises a selection button group, and the control module is further configured to correspondingly activate the barcode scanning module or the character recognition engine according to a trigger event occurring on the selection button group.

In some embodiments, the image comprises at least one character string image, each of the at least one character string image is generated by using the general camera module to photograph at least one character, and the character recognition engine is further configured to recognize and convert each of the at least one character string image into at least one of the at least one second character string.

In some embodiments, the image further comprises at least one barcode image, the at least one barcode image is generated by using the general camera module to photograph at least one second barcode, and the character recognition engine is further configured to recognize and decode the at least one barcode image of the at least one second barcode in the image as at least one of the at least one second character string.

In some embodiments, the preview pane further comprises an enlargement button, and the control module is further configured to enlarge and display the preview pane on the touch display module according to a trigger event occurring on the enlargement button.

In some embodiments, an input method comprises: enabling a system default input method and an image conversion input method by a text input field to display the text input field and an overlapping window at the same time, wherein the overlapping window comprises a virtual keyboard of a system default input method and a preview pane of an image conversion input method; generating at least one character string by using one of the system default input method and the image conversion input method; and displaying one of the at least one character string in the text input field.

In some embodiments, the image conversion input method comprises a barcode scanning input method, and the steps of generating the at least one character string by using one of the system default input method and the image conversion input method comprises: detecting an activation signal of the barcode scanning input method; activating a barcode scanning module in response to the activation signal; scanning at least one barcode through the activated barcode scanning module to obtain at least one barcode image of the at least one barcode; and decoding the at least one barcode image into the at least one character string through the barcode scanning module.

In some embodiments, the input method further comprises generating a preview image with the at least one barcode image and displaying the preview image in the preview pane in a real-time manner in response to that the barcode scanning module obtains the at least one barcode image.

In some embodiments, the overlapping window further comprises a candidate field, the candidate field is above the virtual keyboard and the preview pane, and the steps of generating the at least one character string by using one of the system default input method and the image conversion input method further comprises: displaying the at least one character string in the candidate field as an input option of the text input field.

In some embodiments, the image conversion input method further comprises a character recognition input method, and the steps of generating the at least one character string by using one of the system default input method and the image conversion input method further comprises: detecting another activation signal of the character recognition input method; generating an image by using a general camera module according to the another activation signal, wherein the image comprises at least one character string image, and each of the at least one character string images is generated by using the general camera module to photograph at least one character; displaying the image in the preview pane in a real-time manner; and recognizing and converting the at least one character string image into the at least one character string.

In some embodiments, the image further comprises at least one barcode image, and the at least one barcode image is generated by using the general camera module to photograph at least one second barcode, and the steps of generating the at least one character string by using one of the system default input method and the image conversion input method further comprises: recognizing and converting the at least one barcode image into at least one of the at least one character string.

In some embodiments, the preview pane further comprises an enlargement button, and the input method further comprises enlarging and displaying the preview pane according to a trigger event occurring on the enlargement button.

To sum up, according to one or some embodiments, the mobile device and input method can be applied to the mobile device, so that in addition to the system default input method, the basic input function of the mobile device can use other input methods (e.g., the image conversion input method which uses images to obtain character strings), thereby improving the convenience and efficiency of text input. In some embodiments, the image conversion input method can obtain the character string of the text input field by capturing and analyzing the optical images, so that the operation procedure of text input can be simplified to improve the convenience and efficiency of text input, thereby greatly improving the user's experience. In addition, the image conversion input method provides two image analysis methods to improve the applicable scope of the image conversion input method.

For example, when the user wants to input a character string into the text input field, the user can take a picture of the object with barcode or text in the mobile device so as to execute the barcode scanning input method or the character recognition input method to obtain the character string, and the obtained character string will be directly displayed in the text input field. Therefore, when the user inputs contents in the text input field, the user does not need to manually copy and paste the decoded or recognized character string to the text input field and does not need to switch the operations between the applications in the mobile device.

The following will describe the detailed features and advantages of the instant disclosure in detail in the detailed description. The content of the description is sufficient for any person skilled in the art to comprehend the technical context of the instant disclosure and to implement it accordingly. According to the content, claims and drawings disclosed in the instant specification, any person skilled in the art can readily understand the goals and advantages of the instant disclosure.

DETAILED DESCRIPTION OF THE INVENTION

Figure 1:
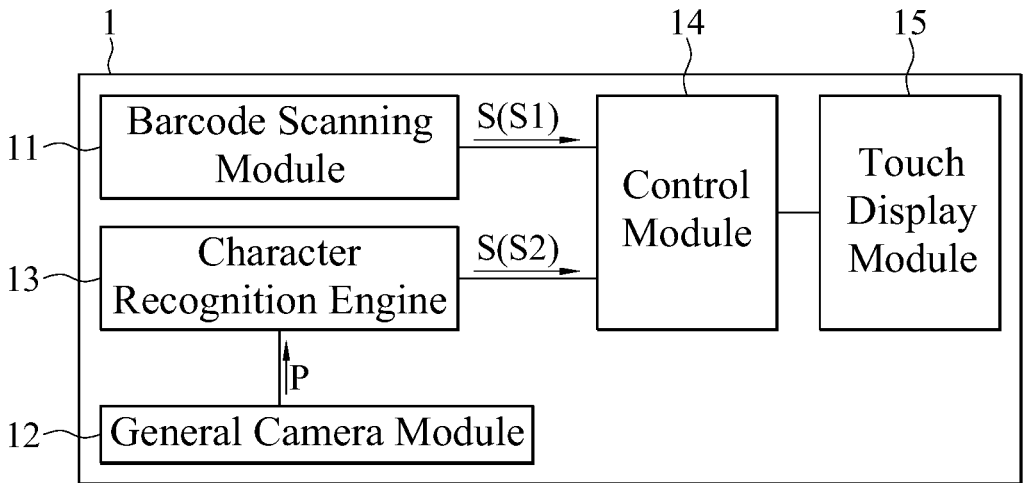
FIG. 1 illustrates a schematic block diagram of an embodiment of a mobile device.

FIG. 1 illustrates a schematic block diagram of an embodiment of a mobile device 1. Please refer to FIG. 1. The mobile device 1 comprises a general camera module 12, a touch display module 15, a barcode scanning module 11, a character recognition engine 13, and a control module 14.

The character recognition engine 13 is coupled to the general camera module 12. The control module 14 is coupled to the general camera module 12, the touch display module 15, the barcode scanning module 11, and the character recognition engine 13.

Figure 2:
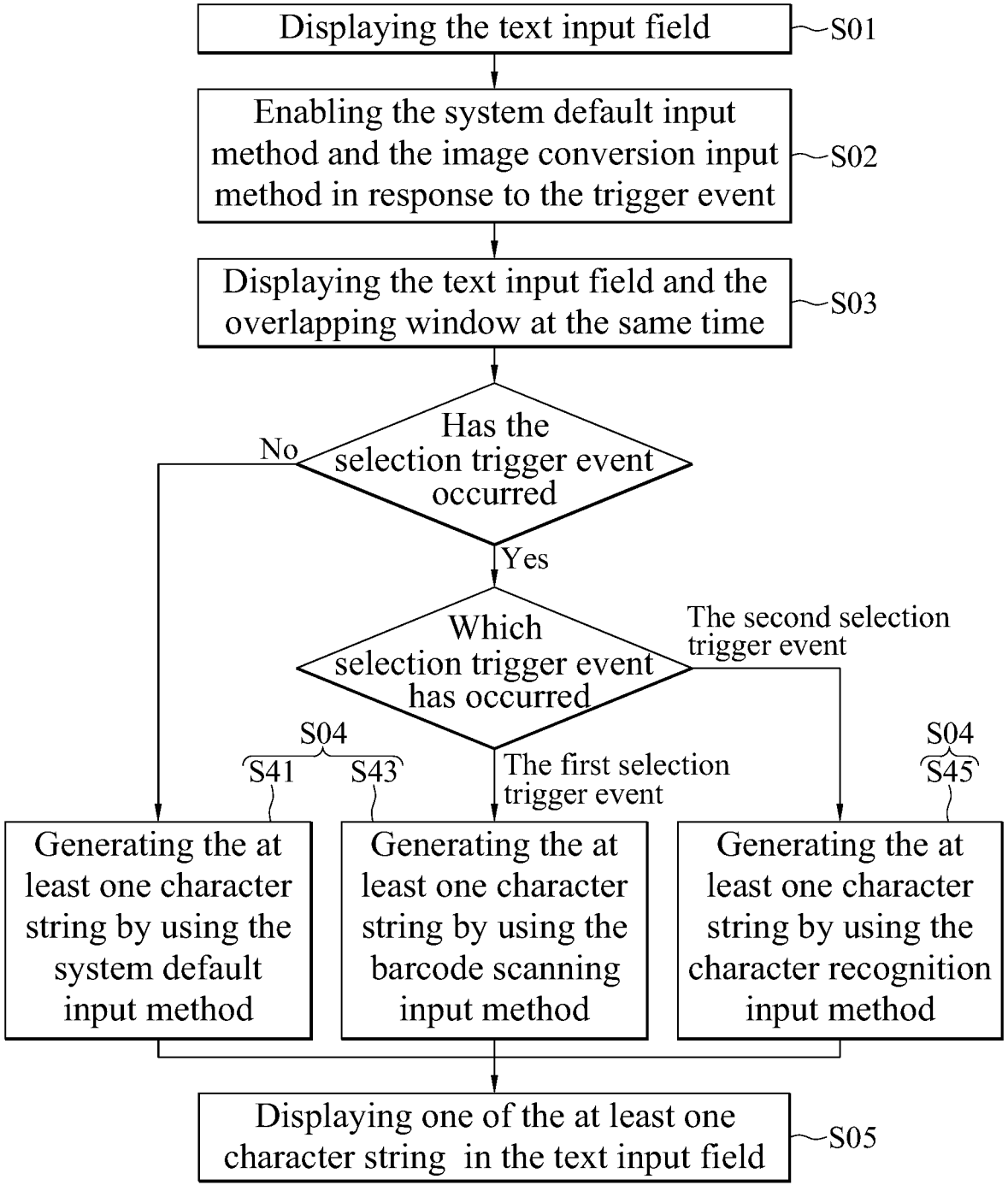
FIG. 2 illustrates a flowchart of an embodiment of an input method.
Figure 3:
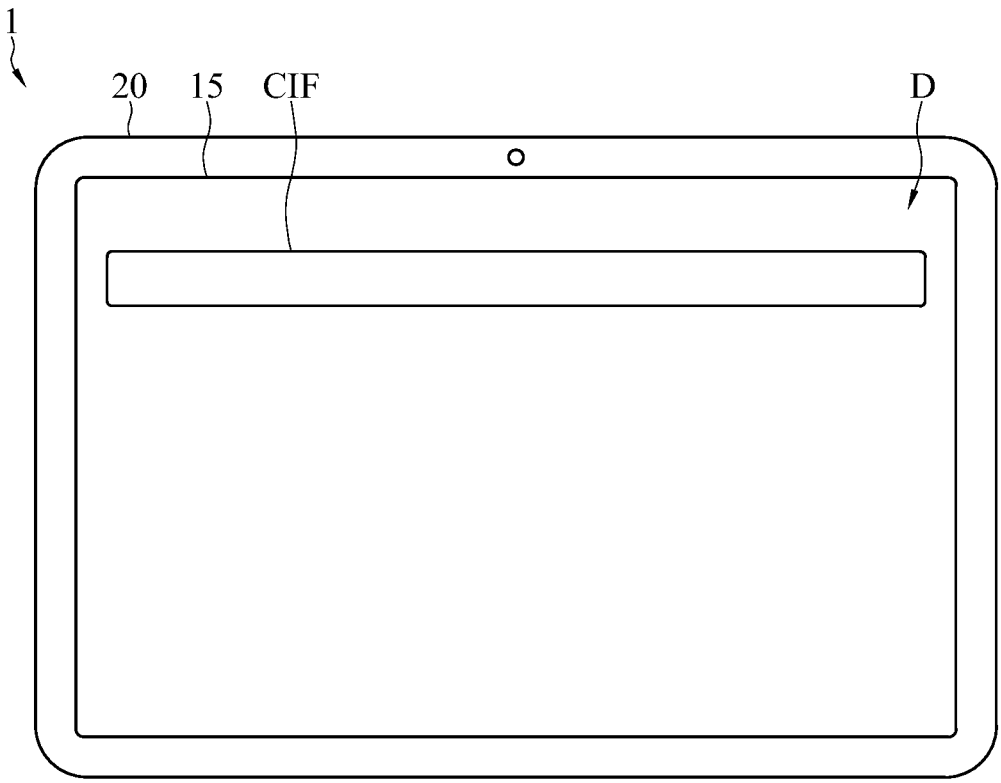
FIG. 3 illustrates a front view of an embodiment of the mobile device.

FIG. 2 illustrates a flowchart of an embodiment of an input method. FIG. 3 illustrates a front view of an embodiment of the mobile device 1. Please refer to FIG. 1 through FIG. 3. The general camera module 12 is configured to photograph to generate an image P. The touch display module 15 is configured to display the text input field CIF (the step S01). Specifically, in some embodiments, the display screen D displayed by the touch display module 15 comprises a text input field CIF, and the text input field CIF may be configured to receive the character string S input by the user.

Figure 4:
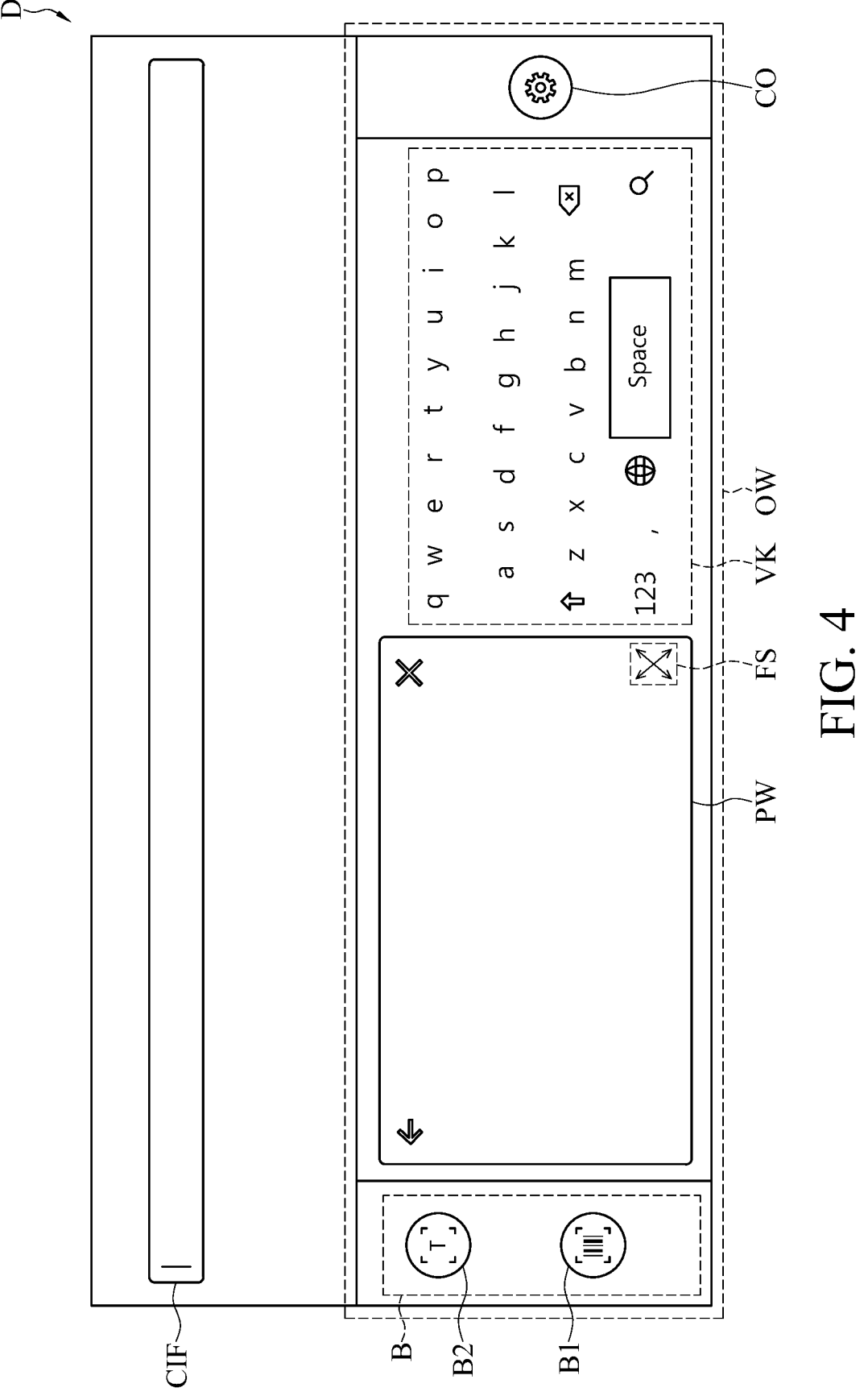
FIG. 4 illustrates a schematic view of an embodiment of a display screen after performing the step S03 in FIG. 2.

FIG. 4 illustrates a schematic view of an embodiment of a display screen D after performing the step S03 in FIG. 2. Please refer to FIG. 4. In some embodiments, in response to a trigger event (hereinafter, referred to as the input trigger event) which occurs in the text input field CIF, the control module 14 enables the system default input method and the image conversion input method (the step S02), so that the control module 14 displays the text input field CIF and an overlapping window OW on the display screen D at the same time (the step S03), wherein the overlapping window OW comprises a virtual keyboard VK of the system default input method and a preview pane PW of the image conversion input method. In other words, in some embodiments, the overlapping window OW is configured to provide the user interface of the input method for the user's operation to generate the character string S accordingly. Before the system default input method and the image conversion input method are enabled, no user interface of input method (such as the overlapping window OW) appears on the display screen D of the touch display module 15; on the other hand, after the system default input method and the image conversion input method are enabled, the user interface (i.e., the overlapping window OW) of the enabled input method (i.e., the system default input method and the image conversion input method) will appear on the display screen D of the touch display module 15, wherein the input trigger event may be that the user clicks the position where the text input field CIF appears in the display screen D to enable the text input field CIF to activate the input function.

For example, when the input trigger event occurs at the position where the text input field CIF appears on the display screen D (for example, the user clicks the text input field CIF so that a cursor appears in the text input field CIF), the system default input method and the image conversion input method are enabled, and the overlapping window OW will appear on the lower half portion of the display screen D after the system default input method and the image conversion input method are enabled.

In some embodiments, the control module 14 correspondingly controls one of the virtual keyboard VK, the barcode scanning module 11, and the character recognition engine 13 according to the currently activated input method (i.e., one of the system default input method and the image conversion input method) to generate at least one character string S (the step S04).

Last, the control module 14 controls the touch display module 15 to display one of the generated character strings S in the text input field CIF (the step S05).

In some embodiments, the image conversion input method comprises a barcode scanning input method and a character recognition input method.

In some embodiments, the overlapping window OW further comprises a selection button group B. In some embodiments, the selection button group B is arranged on the left half portion of the overlapping window OW and is on the left side of the virtual keyboard VK and the preview pane PW.

In some embodiments, the control module 14 is configured to correspondingly activate the barcode scanning module 11 or the character recognition engine 13 according to the trigger event occurring on the selection button group B (hereinafter referred to as the selection trigger event) or according to the trigger event occurring on the virtual keyboard VK to activate the virtual keyboard VK. Specifically, in some embodiments, the selection button group has at least two types of selection trigger events (hereinafter respectively referred to as a first selection trigger event and a second selection trigger event). The first selection trigger event corresponds to the barcode scanning module 11 (the step S43), and the second selection trigger event corresponds to the character recognition engine 13 (the step S45). The first selection trigger event can cause the selection button group B to generate the activation signal of the barcode scanning input method, and the second selection trigger event can cause the selection button group B to generate the activation signal of the character recognition input method. The trigger event occurring on the virtual keyboard VK can cause the virtual keyboard VK to generate the activation signal of the system default input method (the step S41).

In some embodiments, the selection button group B comprises two buttons (hereinafter respectively referred to as the selection button B1 and the selection button B2). The selection button B1 corresponds to the first selection trigger event. The selection button B2 corresponds to the second selection trigger event. Specifically, in some embodiments, the control module 14 executes the barcode scanning input method according to the trigger event occurring on the selection button B1, and the control module 14 executes the character recognition input method according to the trigger event occurring on the selection button B2.

In some embodiments, after the system default input method and the image conversion input method are enabled, the virtual keyboard VK is normally activated. In some embodiments, when the overlapping window OW appears, the control module 14 only activates the virtual keyboard VK, and neither the barcode scanning module 11 nor the text recognition engine 13 is activated. The control module 14 does not activate the barcode scanning module 11 until the first selection trigger event occurs, and the control module 14 does not activate the character recognition engine 13 until the second selection trigger event occurs. In some embodiments, the virtual keyboard VK may be activated along with the activation of the barcode scanning module 11 or the character recognition engine 13 at the same time.

Figure 5:
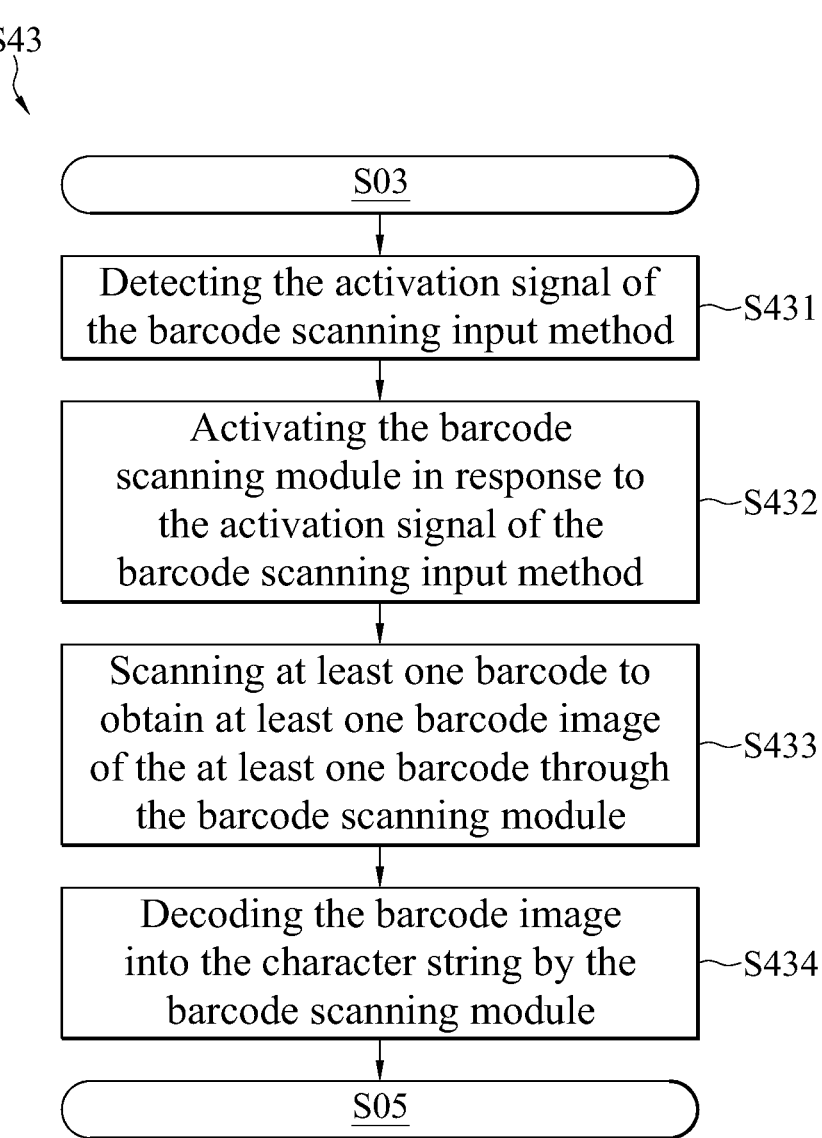
FIG. 5 illustrates a flowchart of an embodiment of the step S43 in FIG. 2.

FIG. 5 illustrates a flowchart of an embodiment of the step S43 in FIG. 2. Please refer to FIG. 5. In some embodiments, in the step S43, when the first selection trigger event occurs on the selection button B1 (that is, the selection button group B generates the activation signal of the barcode scanning input method), the control module 14 detects the activation signal of the barcode scanning input method (the step S431), and thus the control module 14 activates the barcode scanning module 11 in response to the first selection trigger event occurring on the selection button B1 (that is, the control module 14 activates the barcode scanning module 11 in response to the activation signal of the barcode scanning input method) (the step S432). Then, the control module 14 starts to execute the barcode scanning input method.

After the step S432, the control module 14 scans at least one barcode (hereinafter referred to as the first barcode) through the barcode scanning module 11 to obtain at least one first barcode image BC1 of the at least one barcode (the step S433). The barcode scanning module 11 then decodes the at least one first barcode image BC1 into the at least one character string S (the step S434). For the sake of convenience, the character string S generated by the barcode scanning module 11 decoding the first barcode image BC1 is referred to as the first character string S1.

Figure 6:
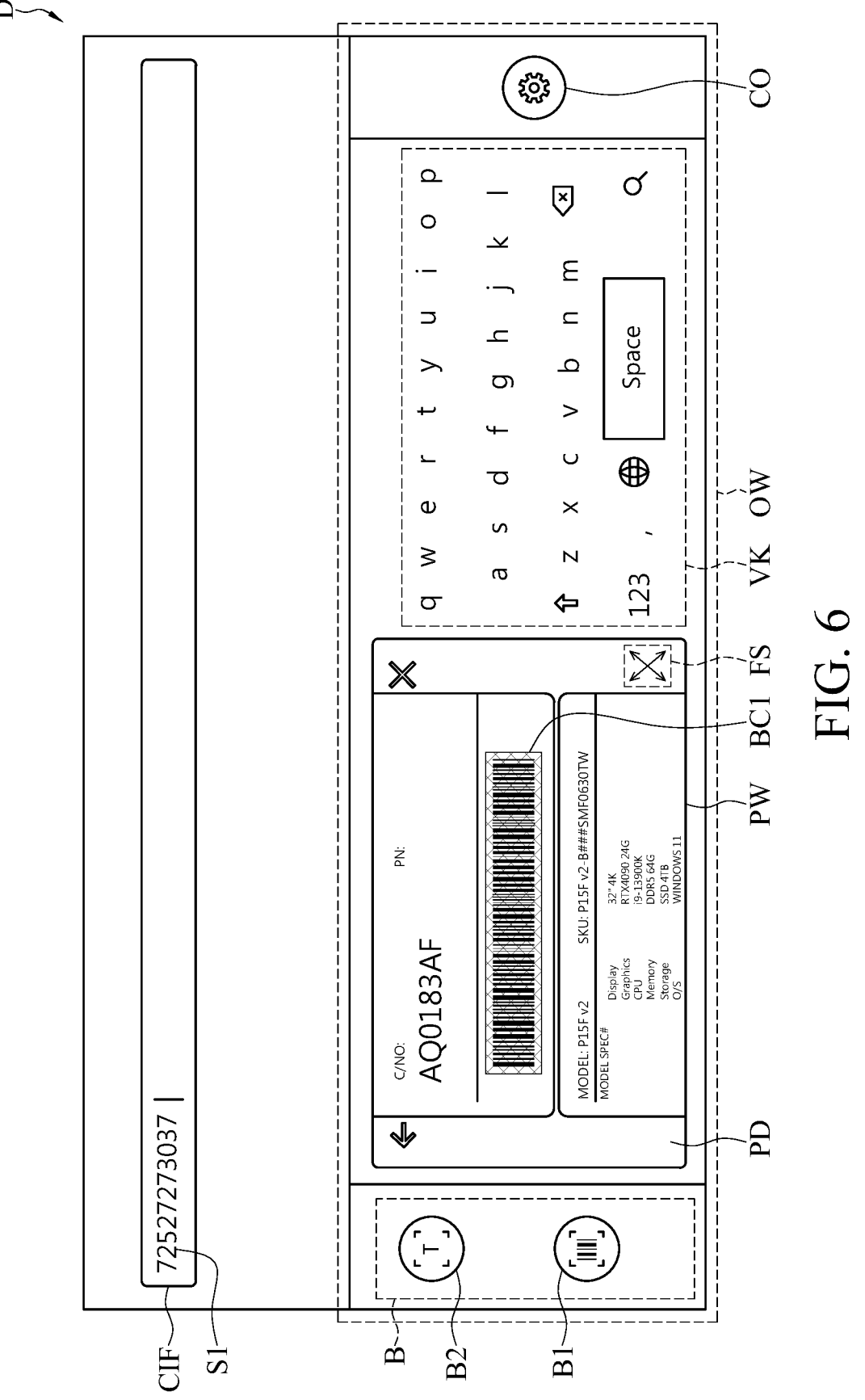
FIG. 6 illustrates a schematic view of an embodiment of the display screen after performing the step S43 in FIG. 5.

FIG. 6 illustrates a schematic view of an embodiment of the display screen after performing the step S43 in FIG. 5. Please refer to FIG. 6. For example, when the first selection trigger event occurs on the selection button B1 (for example, the user clicks the selection button B1 to generate the activation signal of the barcode scanning input method), the control module 14 detects the activation signal of the barcode scanning input method, thus activating the barcode scanning module 11 in response to the first selection trigger event occurring on the selection button B1. Then the control module 14 starts to execute the barcode scanning input method. The control module 14 scans the first barcode through the barcode scanning module 11 to obtain the first barcode image BC1. The barcode scanning module 11 then decodes the first barcode image BC1 into the first character string S1. The decoded first character string S1 is 72527273037. Therefore, the control module 14 displays the first character string S1 (i.e., 72527273037) in the text input field CIF. When the number of the at least one first barcode is multiple, the number of the first barcode image BC1 obtained by scanning the at least one first barcode with the barcode scanning module 11 when the control module 14 executes the barcode scanning input method is also multiple, and the number of the at least one first character string S1 obtained by decoding the at least one first barcode image BC1 through the barcode scanning module 11 is also multiple. Therefore, in some embodiments, the overlapping window OW further comprises a candidate field C, and the candidate field C is above the virtual keyboard VK and the preview pane PW. The control module 14 is further configured to display multiple first character strings S1 as input options of the text input field CIF in the candidate field C and display a first character string S1 in the text input field CIF, wherein the first character string S1 corresponds to the trigger event occurring on the candidate field C.

Figure 7:
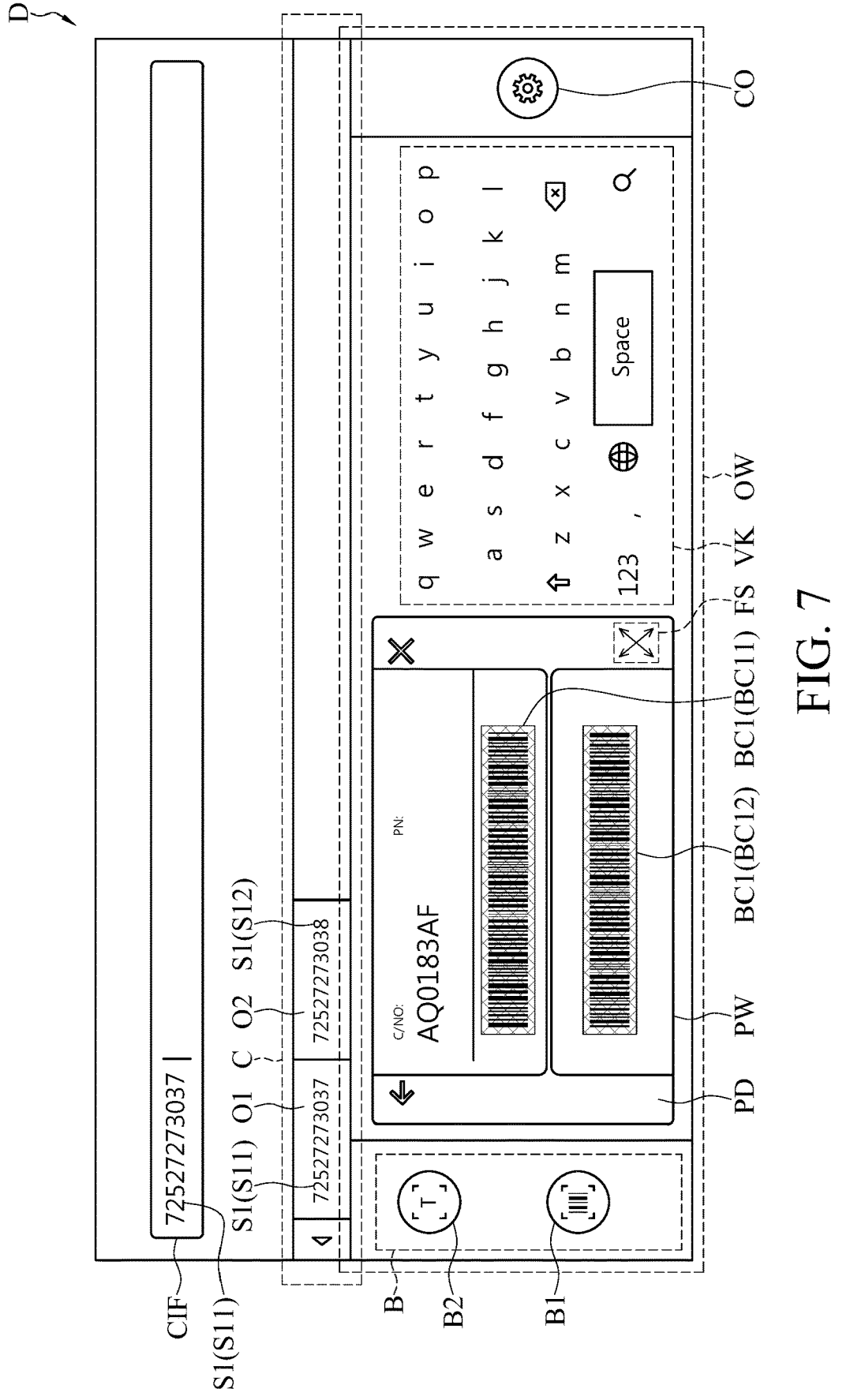
FIG. 7 illustrates a schematic view of another embodiment of the display screen after performing the step S43 in FIG. 5.

FIG. 7 illustrates a schematic view of another embodiment of the display screen D after performing the step S43 in FIG. 5. Please refer to FIG. 7. When the control module 14 scan two first barcodes through the barcode scanning module 11 to obtain two first barcode images BC1 (hereinafter referred to as the first barcode image BC11 and the first barcode image BC12, respectively). The barcode scanning module 11 then decodes the first barcode image BC11 and the first barcode image BC12 into two first character strings S1 (hereinafter referred to as the first character string S11 and the first character string S12, respectively). The decoded first character string S11 is 72527273037, and the decoded first character string S12 is 72527273038. At this time, the control module 14 displays the first character string S11 (i.e., 72527273037) and the first character string S12 (i.e., 72527273038) as the input options of the text input field CIF in the first input option area O1 and the second input option area O2 of the candidate field C. The first character string S11 is displayed in the first input option area O1, and the first character string S12 is displayed in the second input option area O2. At this moment, if a trigger event occurs on the first input option area O1 (for example, the user clicks on the first input option area O1 to select the first character string S11 as the character string displayed in the text input field CIF), the control module 14 then displays the first character string S11 (i.e., 72527273037) in the text input field CIF.

Please refer to FIG. 6. In some embodiments, the barcode scanning module 11 is further configured to generate a preview image PD having the at least one first barcode image BC1 and the control module 14 is further configured to display the preview image PD in the preview pane PW in a real-time manner.

Figure 8:
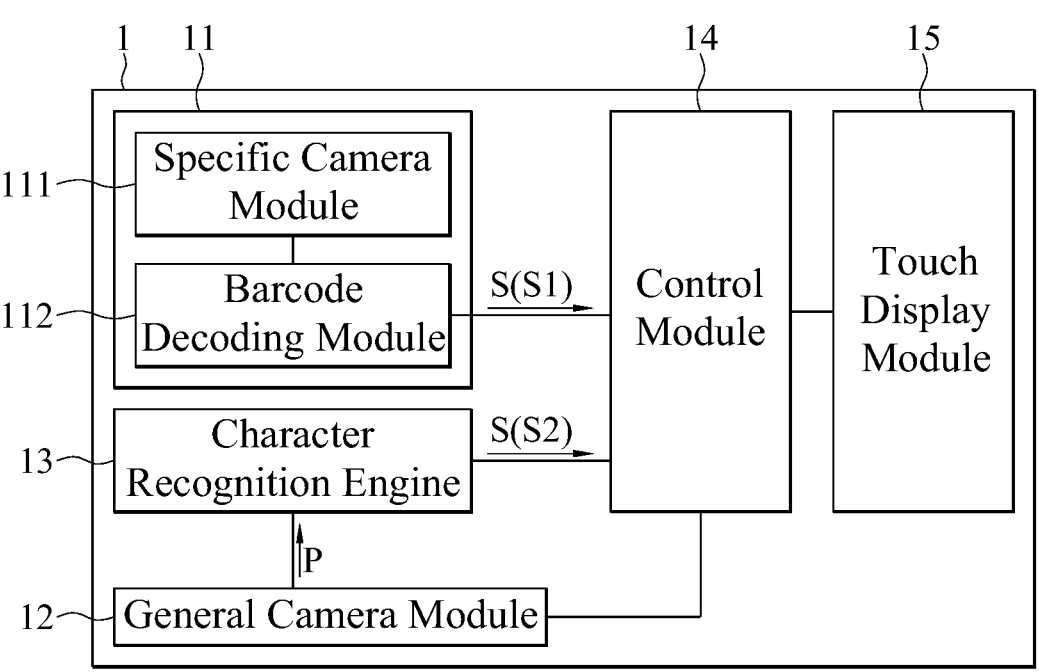
FIG. 8 illustrates a schematic block diagram of another embodiment of the mobile device.

FIG. 8 illustrates a schematic block diagram of another embodiment of the mobile device 1. Please refer to FIG. 8. In some embodiments, the barcode scanning module 11 comprises a specific camera module 111 and a barcode decoding module 112. The specific camera module 111 is configured to photograph the at least one first barcode to obtain the preview image PD having the at least one first barcode image BC1. The barcode decoding module 112 is coupled to the specific camera module 111 and the control module 14, and the barcode decoding module 112 is configured to decode the at least one first barcode image BC1 into the at least one first character string S1. In some embodiments, the barcode scanning module 11 can also directly photograph the first barcode through the general camera module 12 to generate the preview image PD having the at least one first barcode image BC1.

Figure 9:
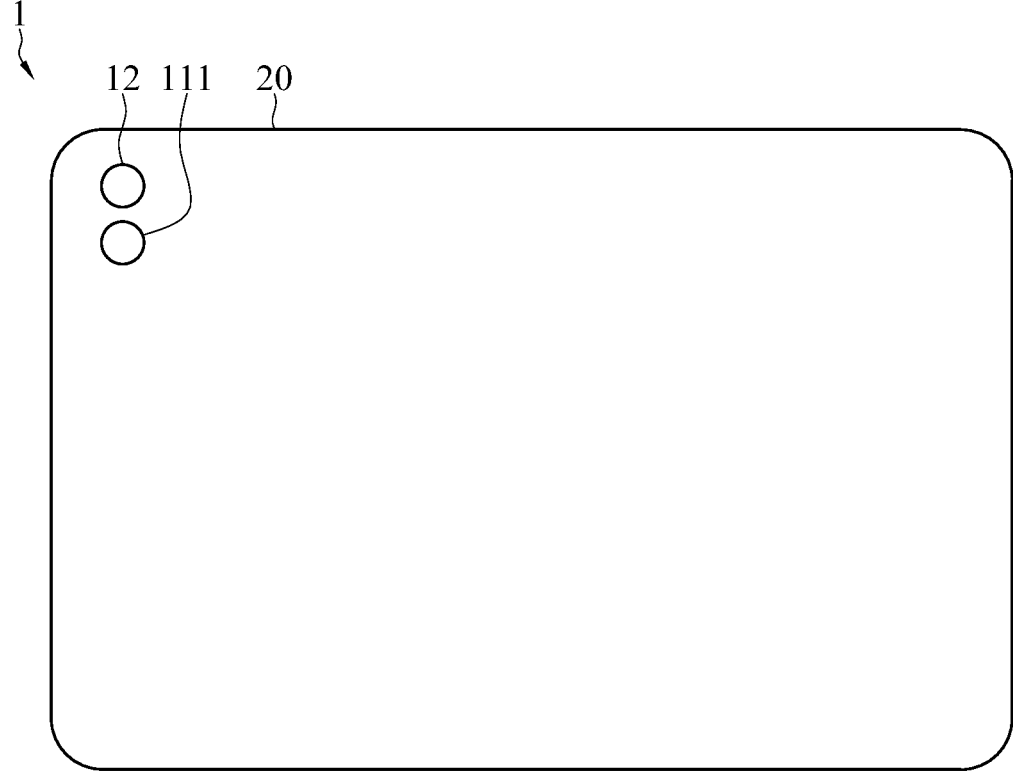
FIG. 9 illustrates a rear view of an embodiment of the mobile device in FIG. 3.

FIG. 9 illustrates a rear view of an embodiment of the mobile device 1 in FIG. 3. Please refer to FIG. 9. In some embodiments, the mobile device 1 comprises a casing 20, wherein the touch display module 15 is embedded in the front surface of the casing 20 (as shown in FIG. 3), and the general camera module 12 and the specific camera module 111 are embedded in the rear surface of the casing 20 (as shown in FIG. 9). In some embodiments, the general camera module 12 and the specific camera module 111 may also be embedded in the front surface or the side surface of the casing 20 (not shown).

In some embodiments, the character string S1 analyzed by the barcode scanning module 11 will be directly displayed in the text input field CIF. Therefore, the user does not need to manually copy and paste the recognized character string to the text input field CIF and/or switch the operations between the applications in the mobile device 1, thereby greatly improving the user's experience.

Figure 10:
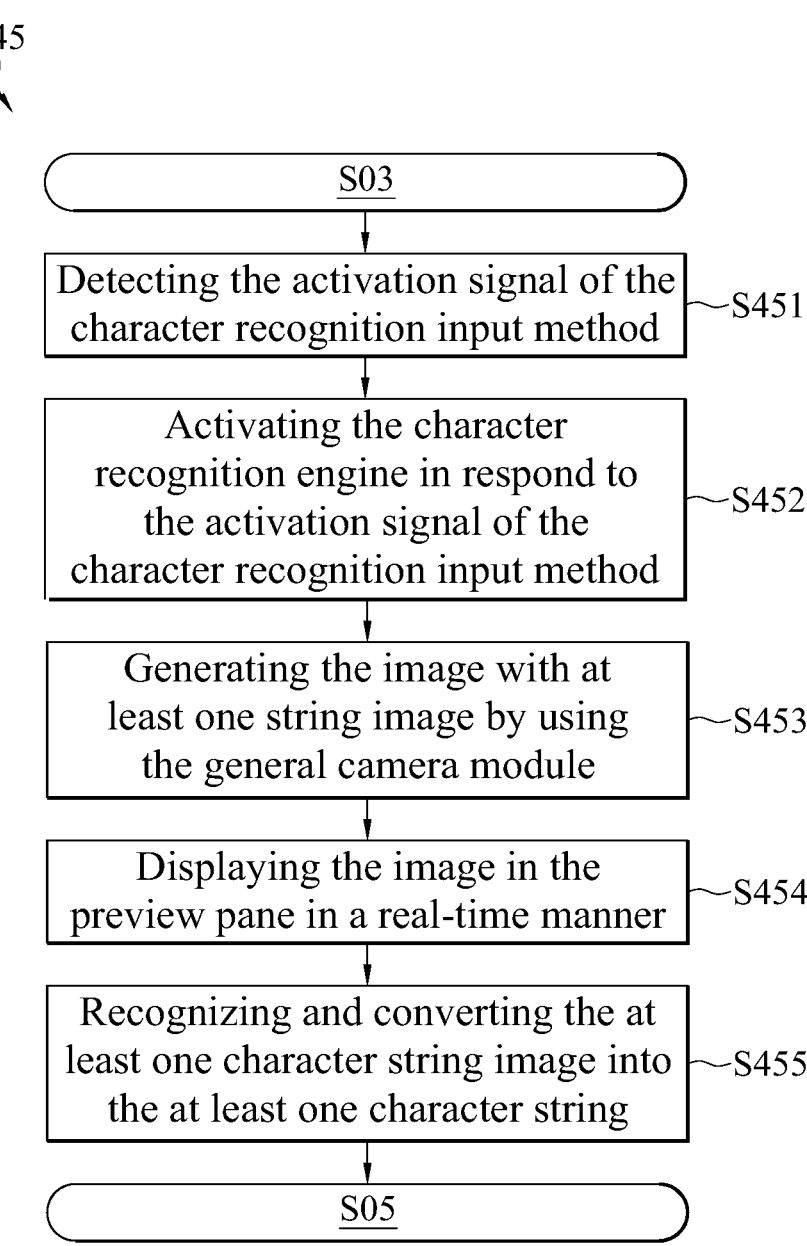
FIG. 10 illustrates a flowchart of an embodiment of the step S45 in FIG. 2.

FIG. 10 illustrates a flowchart of an embodiment of the step S45 in FIG. 2. Please refer to FIG. 10. In some other embodiments, when the second selection trigger event occurs on the selection button group B (that is, the selection button group B generates the activation signal of the character recognition input method), the control module 14 detects the activation signal of the character recognition input method (hereinafter referred to as another activation signal) (the step S451), and thus the control module 14 activates the character recognition engine 13 in response to the another activation signal of the selection button group B (the step S452), and then the control module 14 starts to execute the character recognition input method.

The control module 14 drives the general camera module 12 in response to the another activation signal, so that the general camera module 12 generates the image P by photographing at least one character (the step S453), wherein the image P comprises at least one character string image of the at least one character.

At the same time, the control module 14 controls the touch display module 15 to display the image P in the preview pane PW in a real-time manner (the step S454). Moreover, the character recognition engine 13 recognizes and converts the at least one character string image into the at least one character string S (the step S455). For the sake of convenience, the character string S generated by the character recognition engine 13 recognizing and converting the character string image is referred to as the second character string S2.

In some embodiments, the control module 14 is further configured to display the at least one second character string S2 in the candidate field C as the input option of the text input field CIF and display a second character string S2 in the text input field CIF, wherein the second character string S2 corresponds to the trigger event occurring on the candidate field C.

Figure 11:
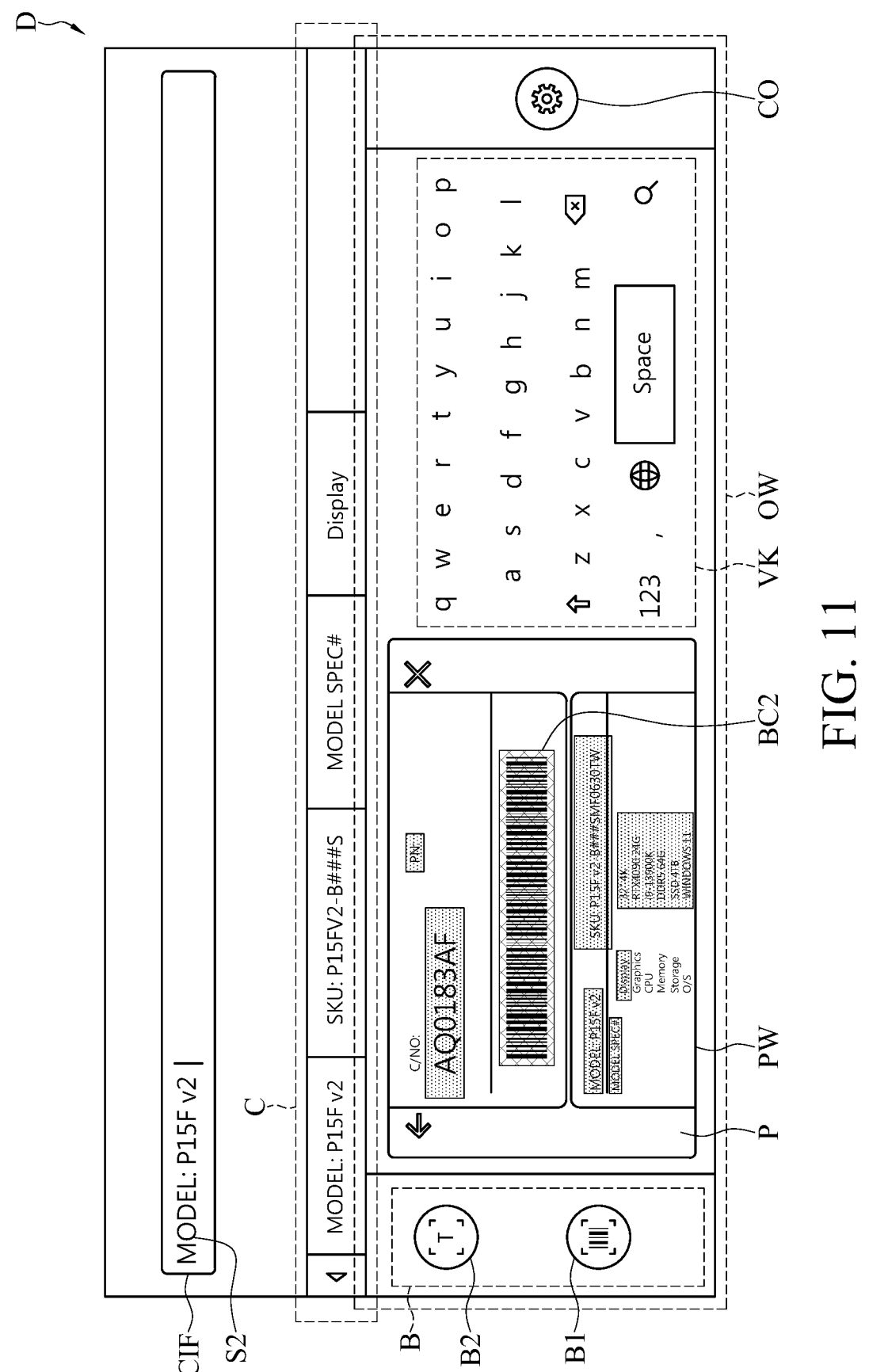
FIG. 11 illustrates a schematic view of an embodiment of the display screen after performing the step S45 in FIG. 10.

FIG. 11 illustrates a schematic view of an embodiment of the display screen D after performing the step S45 in FIG. 10. Please refer to FIG. 11. For example, when the second selection trigger event occurs on the selection button B2 (for example, the user clicks the selection button B2 to generate the activation signal of the character recognition input method), the control module 14 detects the activation signal of the character recognition input method, thus activating the character recognition engine 13 in response to the second selection trigger event occurring on the selection button B2. The control module 14 then starts to execute the character recognition input method. The control module 14 generates the image P through the general camera module 12, wherein the image P comprises multiple character string images, and each of the character string images is generated through the general camera module 12 by photographing the at least one character. The control module 14 displays the image P in the preview pane PW in a real-time manner, and the character recognition engine 13 recognizes and converts the multiple character string images into multiple second character strings S2. The control module 14 displays the multiple second character strings S2 as input options in the text input field CIF in the candidate field C, and the control module 14 displays a second character string S2 in the text input field CIF, wherein the second character string S2 corresponds to the trigger event occurring on the candidate field C. In the embodiment of FIG. 11, the second character string S2 displayed in the text input field CIF is MODEL:P15F.v2.

In some embodiments, the second character string S2 analyzed by the character recognition engine 13 is directly displayed in the text input field CIF. Therefore, when the user wants to input the second character string S2 in the text input field CIF, the user does not need to manually copy and paste the recognized character string to the text input field CIF and/or switch the operations between the applications in the mobile device 1, thereby greatly improving the user's experience.

In some embodiments, the character recognition engine 13 can also be configured to scan and decode the at least one barcode (hereinafter referred to as the second barcode) to obtain the character string represented by the second barcode. Specifically, in some embodiments, the general camera module 12 can generate the image P of at least one second barcode image BC2 having the at least one second barcode by photographing the at least one second barcode.

The character recognition engine 13 is further configured to recognize and decode the at least one second barcode image BC2 in the image P into at least one of the at least one second character string S2. For example, please refer to FIG. 5, in addition to multiple character string images, the image P further comprises the second barcode image BC2 of the second barcode. In addition to recognizing and converting multiple character string images in the image P into multiple character strings S2, the character recognition engine 13 is further configured to recognize and decode the second barcode image BC2 of the second barcode in the image P as one of multiple second character strings S2.

In some implementations, if the general camera module 12 photographs the at least one character and the at least one second barcode at the same time, the image P will have the character string image and the barcode image at the same time. In some other implementations, if the general camera module 12 only photographs the at least one character, the image P will only have the character string image. In some other implementations, if the general camera module 12 only photographs the at least one second barcode, the image P will only have the barcode image.

In some embodiments, the selection button group B can be a single physical button or multiple physical buttons (i.e., selection buttons), or a single virtual button or multiple virtual buttons (i.e., selection buttons), or a combination thereof. In some implementations, if the selection button group B is a single button, the first selection trigger event and the second selection trigger event can be distinguished by the continuous number or continuous time of enabling (such as pressing and electric shock) the button or the odd and even times of enabling the button.

In some implementations, the number of buttons included in the selection button group B is the same as the number of types of the selection trigger event, and the buttons included in the selection button group B correspond to the different type of the selection trigger event in a one-to-one correspondence. In an example, the buttons of the selection button group B corresponding to the first selection trigger event and the second selection trigger event are both physical buttons. In another example, the buttons of the selection button group B corresponding to the first selection trigger event are one of the physical buttons and the virtual buttons, and the buttons of the selection button group B corresponding to the second selection trigger event are the other one of the physical buttons and the virtual buttons. In yet another example, the buttons of the selection button group B corresponding to the first selection trigger event and the second selection trigger event are virtual buttons.

In some embodiments, the preview pane PW further comprises an enlargement button FS. The control module 14 is further configured to enlarge and display the preview pane PW on the display screen D according to the trigger event occurring on the enlargement button FS.

Figure 12:
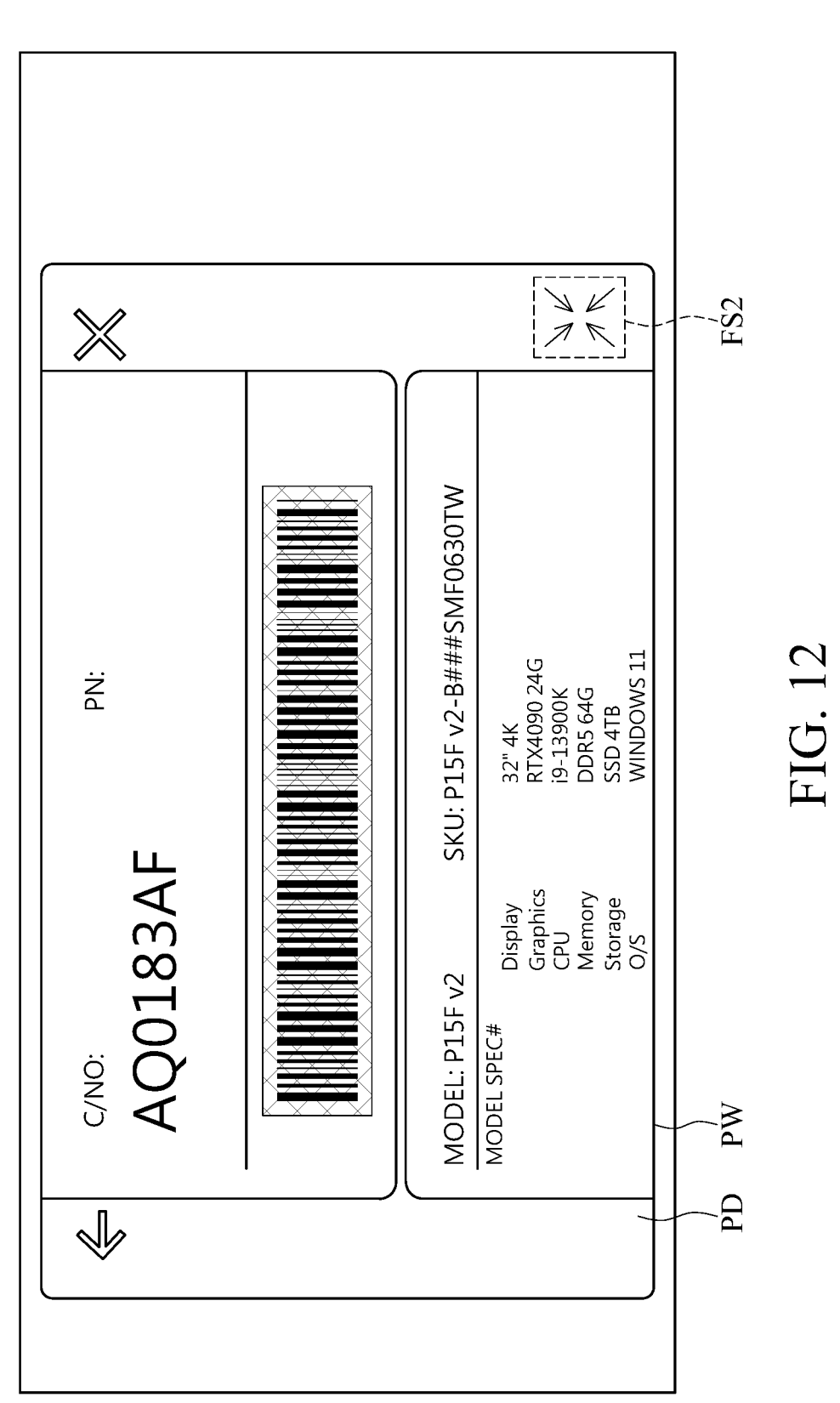
FIG. 12 illustrates a schematic view of an embodiment of a display screen after the preview pane is enlarged and displayed.

FIG. 12 illustrates a schematic view of an embodiment of a display screen D after the preview pane PW is enlarged and displayed. Please refer to FIG. 6 and FIG. 12. For example, when the trigger event occurs on the enlargement button FS (for example, the user clicks the enlargement button FS to enlarge and display the preview pane PW), the control module 14 detects the trigger event, and thus the control module 14 enlarges and displays the preview pane PW on the display screen D in response to the trigger event. In some embodiments, the control module 14 displays the preview pane PW on the display screen D in full screen. In some embodiments, after the preview pane PW is displayed on the display screen D in full screen, the preview pane PW further comprises a return button FS2 and does not comprise the enlargement button FS. The control module 14 is further configured, according to the trigger event occurring on the return button FS2, to display the preview pane PW on the display screen D with the size of the preview pane PW before the preview pane PW is displayed in full screen.

In some embodiments, the overlapping window OW further comprises a control option button CO. The control option button CO is configured to open and close the setting window for setting or adjusting various functions of the image conversion input method and various functions of the overlapping window OW.

In some embodiments, the mobile device 1 may be but not limited to a smart phone, a tablet or a notebook.

In some embodiments, the barcode scanning module 11 is an independent component, such as but not limited to a barcode scanner (also known as a barcode engine), wherein the barcode scanner may be but not limited to a laser scanner, a CCD scanner or a photographic scanner.

In some embodiments, each of the general camera module 12 and the specific camera module 111 can be implemented using a combination of a photosensitive element and a lens, wherein the photosensitive element is configured to capture images (including barcode images and character string images) and convert the images from optical signals into electrical signals. The photosensitive element may be, for example but not limited to, a charge-coupled device (CCD) or a complementary metal oxide semiconductor sensor (CMOS sensor).

In some embodiments, the character recognition engine 13 may be but not limited to Tesseract, Azure, Real-Time Recognition SDK, or Ocr Space.

In some embodiments, each of the barcode decoding module 112, the character recognition engine 13, and the control module 14 is implemented using one or more hardware devices executing software or firmware implementing corresponding computing functions.

In some other embodiments, the barcode decoding module 112 is implemented using a hardware device executing software or firmware implementing corresponding computing functions, while the character recognition engine 13 and the control module 14 are implemented using another hardware device executing software or firmware implementing corresponding computing functions.

In some other embodiments, the barcode decoding module 112, the character recognition engine 13, and the control module 14 are implemented using a single hardware component executing software or firmware implementing corresponding computing functions.

In some embodiments, each of the hardware components may be, for example but not limited to, a central processing unit (CPU), a microprocessor, a digital signal processor (DSP), a complex programmable logic device (CPLD), Field Programmable Gate Array (FPGA), Application Specific Integrated Circuits (ASIC), or microcontroller unit.

In some embodiments, the text input field CIF may be a desktop widget constantly resident on the desktop provided by the operating system or application of the mobile device 1 (such as but not limited to the search bar on the main screen of the mobile device 1), a field for search engines in applications or webpages (such as but not limited to App Store search engine or Google search engine), or a text input page or a field in applications or webpages (such as but not limited to Word input page or Facebook create post field)

To sum up, in some embodiments, the mobile device 1 can execute the image conversion input method in addition to the system default input method so as to improve the convenience and efficiency of text input. The image conversion input method can directly obtain the character string S input in the text input field CIF by capturing and analyzing the preview image PD or image P, so that the operation procedure of text input can be simplified to improve the convenience and efficiency of text input, and further greatly improve user's experience. Moreover, the image conversion input method provides two image analysis methods, the barcode scanning input method and the character recognition input method, which can further enhance the applicable scope of the image conversion input method. The user can use the mobile device 1 to take pictures of objects with barcodes or texts so as to execute the barcode scanning input method or the character recognition input method to obtain the character string S, and the obtained character string S will be directly displayed in the text input field CIF. Therefore, when the user inputs contents in the text input field CIF, the user does not need to manually copy and paste the decoded or recognized character string S to the text input field CIF, and does not need to switch the operations between the applications in the mobile device 1.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A mobile device comprising:
a general camera module configured to generate an image;
a touch display module configured to display a text input field and an overlapping window with a virtual keyboard of a system default input method and a preview pane of an image conversion input method at the same time;
a barcode scanning module configured to scan at least one first barcode to obtain at least one first character string represented by the at least one first barcode, wherein the image conversion input method is linked to the barcode scanning module;
a character recognition engine coupled to the general camera module, the character recognition engine is configured to perform a character recognition on the image to obtain at least one second character string, wherein the image conversion input method is linked to the character recognition engine; and
a control module coupled to the general camera module, the touch display module, the barcode scanning module, and the character recognition engine, wherein the control module is configured to activate one of the barcode scanning module and the character recognition engine and control the touch display module to display one of the at least one first character string and the at least one second character string in the text input field;
wherein the overlapping window further comprises a candidate field, the candidate field is above the virtual keyboard and the preview pane, the candidate field has at least two input option areas, and the control module is further configured to display both of the at least one first character string and the at least one second character string as input options of the text input field in the at least two input option areas of the candidate field.

2. The mobile device according to claim 1, wherein the barcode scanning module is further configured to generate a preview image having at least one barcode image, and the control module is further configured to display the preview image in the preview pane in a real-time manner.

3. The mobile device according to claim 2, wherein the barcode scanning module comprises:
a specific camera module configured to photograph the at least one first barcode to obtain the at least one barcode image and the preview image; and
a barcode decoding module coupled to the specific camera module and the control module, wherein the barcode decoding module is configured to decode the at least one barcode image into the at least one first character string.

4. The mobile device according to claim 1, wherein the control module is further configured to display the image in the preview pane in a real-time manner after the character recognition engine is activated.

5. The mobile device according to claim 1, wherein the overlapping window further comprises a selection button group, and the control module is further configured to correspondingly activate the barcode scanning module or the character recognition engine according to a trigger event occurring on the selection button group.

6. The mobile device according to claim 1, wherein the image comprises at least one character string image, each of the at least one character string image is generated by using the general camera module to photograph at least one character, and the character recognition engine is further configured to recognize and convert each of the at least one character string image into at least one of the at least one second character string.

7. The mobile device according to claim 6, wherein the image further comprises at least one barcode image, the at least one barcode image is generated by using the general camera module to photograph at least one second barcode, and the character recognition engine is further configured to recognize and decode the at least one barcode image of the at least one second barcode in the image as at least one of the at least one second character string.

8. The mobile device according to claim 1, wherein the preview pane further comprises an enlargement button, and the control module is further configured to enlarge and display the preview pane on the touch display module according to a trigger event occurring on the enlargement button.

9. A mobile device comprising:

a general camera module configured to generate an image;

a touch display module configured to display a text input field and an overlapping window with a virtual keyboard of a system default input method and a preview pane of an image conversion input method at the same time;

a barcode scanning module configured to scan at least one first barcode to obtain at least one first character string represented by the at least one first barcode, wherein the image conversion input method is linked to the barcode scanning module;

a character recognition engine coupled to the general camera module, the character recognition engine is configured to perform a character recognition on the image to obtain at least one second character string, wherein the image conversion input method is linked to the character recognition engine; and a control module coupled to the general camera module, the touch display module, the barcode scanning module, and the character recognition engine, wherein the control module is configured to activate one of the barcode scanning module and the character recognition engine and control the touch display module to display one of the at least one first character string and the at least one second character string in the text input field;

wherein the overlapping window further comprises a selection button group, the selection button group comprises a first selection button corresponding to the barcode scanning module and a second selection button corresponding to the character recognition engine, and the control module is further configured to correspondingly activate the barcode scanning module or the character recognition engine according to a first trigger event occurring on the first selection button or a second trigger event occurring on the second selection button.

10. The mobile device according to claim 9, wherein the barcode scanning module is further configured to generate a preview image having at least one barcode image, and the control module is further configured to display the preview image in the preview pane in a real-time manner.

11. The mobile device according to claim 10, wherein the barcode scanning module comprises:

a specific camera module configured to photograph the at least one first barcode to obtain the at least one barcode image and the preview image; and a barcode decoding module coupled to the specific camera module and the control module, wherein the barcode decoding module is configured to decode the at least one barcode image into the at least one first character string.

12. The mobile device according to claim 9, wherein the overlapping window further comprises a candidate field, the candidate field is above the virtual keyboard and the preview pane, and the control module is further configured to display one of the at least one first character string and the at least one second character string as an input option of the text input field in the candidate field.

13. The mobile device according to claim 9, wherein the control module is further configured to display the image in the preview pane in a real-time manner after the character recognition engine is activated.

14. The mobile device according to claim 9, wherein the image comprises at least one character string image, each of the at least one character string image is generated by using the general camera module to photograph at least one character, and the character recognition engine is further configured to recognize and convert each of the at least one character string image into at least one of the at least one second character string.

15. The mobile device according to claim 14, wherein the image further comprises at least one barcode image, the at least one barcode image is generated by using the general camera module to photograph at least one second barcode, and the character recognition engine is further configured to recognize and decode the at least one barcode image of the at least one second barcode in the image as at least one of the at least one second character string.

16. The mobile device according to claim 9, wherein the preview pane further comprises an enlargement button, and the control module is further configured to enlarge and display the preview pane on the touch display module according to a trigger event occurring on the enlargement button.

17. A mobile device comprising:

a general camera module configured to generate an image;

a touch display module configured to display a text input field and an overlapping window with a virtual keyboard of a system default input method and a preview pane of an image conversion input method at the same time;

a barcode scanning module configured to scan at least one first barcode to obtain at least one first character string represented by the at least one first barcode and to generate a preview image having at least one first barcode image, wherein the barcode scanning module comprises a specific camera module configured to photograph the at least one first barcode to obtain the at least one first barcode image and the preview image, and the image conversion input method is linked to the barcode scanning module;

a character recognition engine coupled to the general camera module, the character recognition engine is configured to perform a character recognition on the image to obtain at least one second character string, wherein the image conversion input method is linked to the character recognition engine; and a control module coupled to the general camera module, the touch display module, the barcode scanning module, and the character recognition engine, wherein the control module is configured to activate one of the barcode scanning module and the character recognition engine and control the touch display module to display one of the at least one first character string and the at least one second character string in the text input field;

wherein the image comprises at least one second barcode image, the at least one barcode image is generated by using the general camera module to photograph at least one second barcode, and the general camera module and the specific camera module are separate camera modules.

* * * * *